(12) United States Patent
Jadot et al.

(10) Patent No.: US 7,202,629 B2
(45) Date of Patent: Apr. 10, 2007

(54) METHOD FOR ADJUSTING PARAMETERS OF AN ELECTRIC MOTOR AND VARIABLE SPEED DRIVE USING SUCH A METHOD

(75) Inventors: Fabrice Jadot, Pacy sur Eure (FR); Francois Malrait, Jouy sur Eure (FR); Rodolphe Sepulchre, Neupre (BE)

(73) Assignee: Schneider Toshiba Inverter Europe SAS, Pacy-sur Eure (FR)

( * ) Notice: Subject to any disclaimer, the term of this patent is extended or adjusted under 35 U.S.C. 154(b) by 0 days.

(21) Appl. No.: 11/391,496

(22) Filed: Mar. 29, 2006

(65) Prior Publication Data

US 2006/0232237 A1    Oct. 19, 2006

(30) Foreign Application Priority Data

Apr. 13, 2005   (FR) .................................. 05 50944

(51) Int. Cl.
*H02P 21/10* (2006.01)
(52) U.S. Cl. .................................. 318/812; 318/432
(58) Field of Classification Search ........ 318/432–433, 318/609–610, 798–812
See application file for complete search history.

(56) References Cited

U.S. PATENT DOCUMENTS

| | | | |
|---|---|---|---|
| 4,044,285 A * | 8/1977 | Plunkett et al. ............. | 318/803 |
| 4,670,698 A | 6/1987 | Fulton et al. | |
| 5,278,485 A | 1/1994 | Kim | |
| 6,137,258 A * | 10/2000 | Jansen ......................... | 318/802 |
| 6,335,605 B1 * | 1/2002 | Negoro ....................... | 318/727 |
| 6,404,162 B1 * | 6/2002 | Tajima et al. ............... | 318/799 |
| 6,828,744 B2 * | 12/2004 | Na .............................. | 318/432 |
| 2003/0015988 A1 * | 1/2003 | Giuseppe .................... | 318/727 |
| 2003/0155885 A1 | 8/2003 | Zaremba et al. | |

FOREIGN PATENT DOCUMENTS

EP    0 899 864 A1   3/1999

* cited by examiner

*Primary Examiner*—Bentsu Ro
(74) *Attorney, Agent, or Firm*—Oblon, Spivak, McClelland, Maier & Neustadt, P.C.

(57) ABSTRACT

The invention concerns a method for adjusting motor parameters in a variable speed drive intended to control an electric induction motor M. The method includes a step for determining differences $\Delta I_D$ and $\Delta I_Q$ between motor flux current and motor torque current references and measurements, a step for calculating a correction value $\Delta R_R$ of the rotor resistance and a correction value $\Delta L_R$ of the rotor inductance from the integral terms of the differences $\Delta I_D$ and $\Delta I_Q$, a step for adjusting values of parameters of the motor model based on $\Delta L_R$ and $\Delta R_R$, a step for generating control voltages $U_D$ and $U_Q$ to be applied to the motor M using said adjusted motor parameter values.

6 Claims, 1 Drawing Sheet

Figure 1:
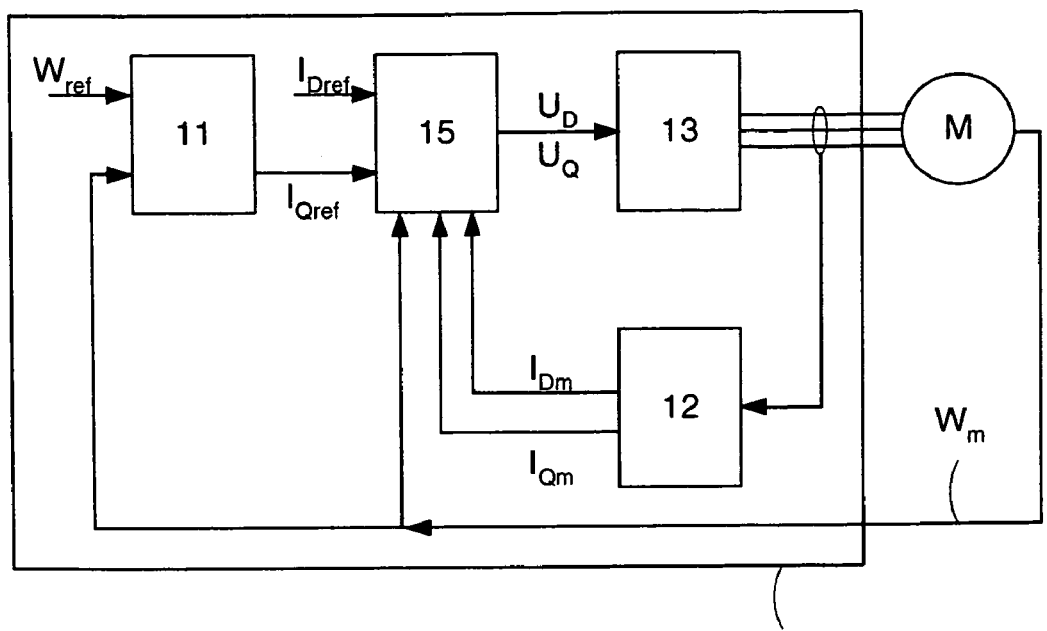

METHOD FOR ADJUSTING PARAMETERS OF AN ELECTRIC MOTOR AND VARIABLE SPEED DRIVE USING SUCH A METHOD

The present invention relates to a method for adjusting motor parameters in an electronic variable speed drive, of the frequency converter type, intended to monitor and control an electric induction motor. The invention also concerns a variable speed drive implementing such a method.

An electronic variable speed drive of the frequency converter type is responsible for controlling an induction motor, i.e. a motor having the Blondel-Park properties such as a three-phase asynchronous motor. The variable drive is powered by a fixed frequency electrical AC distribution network and delivers to the motor an AC feed with variable voltage and frequency, depending on the speed settings and on the requirements of the application. For this purpose, a variable speed drive includes a processing unit capable of driving control electronics by employing vector flux control.

To achieve good motor performance, the control of the variable speed drive must be based on a reliable representation of an electric model of the motor using a set of physical parameters. It is therefore necessary to know a certain amount of data that is representative of the characteristics of the motor in order to establish this model.

Some of this motor data is provided by the manufacturer of the electric motor to be controlled. This data is called basic data or sometimes "plate data" since it is usually inscribed on an identification plate fixed to the motor. It can also be provided in the motor's documentation.

However, not all the data needed to generate the model of the motor is provided with the motor and it is therefore necessary to estimate certain missing parameters by calculation or by measurement using various conceivable methods, to arrive at a reliable model of the motor. These methods use for example a preliminary phase of identification or self-learning of the motor, or store in the variable drive series of estimated values corresponding to parameters to be estimated from data tables, or calculate certain parameters by means of empirical equations.

Nevertheless, certain motor parameters can change over time during motor operation, in particular the rotor resistance $R_R$ which fluctuates a great deal with motor temperature. If, at a given instant, there is an error in the estimation of the value of this rotor resistance, then the electric current supplied to the motor by the variable drive can be higher than necessary for the motor's rated operating point. Likewise, the rotor inductance $L_R$ of the motor can vary when the flux changes (for example when operating in the defluxing zone). Now, the precision of the torque delivered by the motor depends on the precision of the rotor inductance value.

The performance of the variable drive+motor assembly can hence be degraded through problems of consumption or overheating, or by generating oscillations of current, speed and torque. It would therefore be significant to be able to adjust, during operation, the parameters estimated beforehand so as to optimize the control of the motor.

This is why the invention aims, when there is a measurement of the motor speed in the variable drive (closed loop operation), to correct in real time the values of the rotor resistance $R_R$ and the rotor inductance $L_R$ of the motor using the integral term of the current loop, thus making it possible to adjust the values of the motor model parameters.

To this end, the invention describes a method for adjusting motor parameters in a variable speed drive intended to control an electric induction motor. The method includes a step for determining a first difference between a motor torque current reference and a motor torque current measurement, and a second difference between a motor flux current reference and a motor flux current measurement, a step for calculating a correction value of the motor's rotor resistance and a correction value of the motor's rotor inductance from the integral term of the said first difference and from the integral term of the said second difference, a step for adjusting values of parameters of the motor model based on the said correction values of the rotor inductance and the rotor resistance, and a step for generating control voltages to be applied to the motor, using the said adjusted motor parameter values.

According to one characteristic, the torque current reference is obtained from a motor speed reference and from a motor speed measurement.

According to another characteristic, the method is implemented in the variable drive when the motor speed measurement exceeds a predetermined threshold value.

Figure 2:
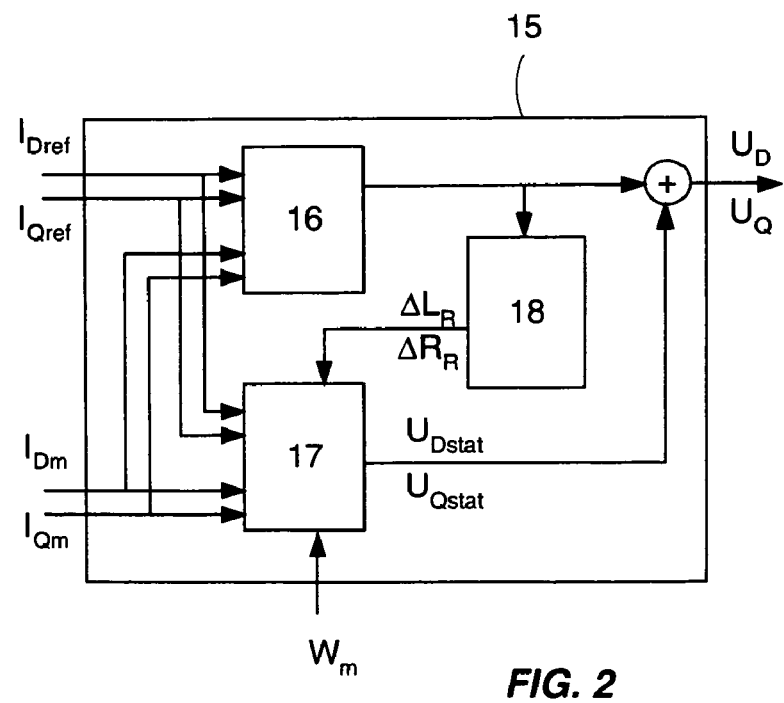

Other characteristics and advantages will become apparent in the following detailed description referring to an embodiment given by way of example and represented by the accompanying drawings in which:

FIG. 1 represents a simplified block diagram of the control system of an induction motor according to the invention, FIG. 2 details the current regulator block 15 of FIG. 1.

With reference to FIG. 1, a variable speed drive, of the frequency converter type, is responsible for controlling and monitoring a three-phase asynchronous electric motor M, by virtue of a processing unit 10 capable in particular of driving control electronics (not represented in FIG. 1) by using vector flux control. A speed sensor provides the variable drive with a feedback of the real motor speed $W_m$.

The processing unit 10 of the variable speed drive includes a speed regulator block 11 which receives at its input a motor speed reference $W_{ref}$ and the motor speed measurement $W_m$, so as to deliver at its output a motor torque current reference $I_{Qref}$. This motor torque current reference $I_{Qref}$ is determined with precision since it is based on a measured real value $W_m$ of the motor speed.

The next block in the processing unit 10 of the variable speed drive is a current regulator block 15 which receives at its input a motor flux current reference $I_{Dref}$ and the motor torque current reference $I_{Qref}$ from block 11. Block 15 also receives the measured values of motor torque current and motor flux current, $I_{Qm}$ and $I_{Dm}$ respectively, and the motor speed measurement $W_m$. The values $I_{Qm}$ and $I_{Dm}$ can come from a converter block 12 which converts in a known way measurements from voltage and current sensors on the motor's supply conductors (i.e. conversion by rotation of the voltages of the threes phases of the motor to d, q coordinates).

The current regulator block 15 delivers at its output a flux control voltage $U_D$ and a torque control voltage $U_Q$ to a converter block 13 which converts them in the conventional way to voltage settings for the control electronics supplying the various phases of the motor M.

According to the invention, the current regulator block 15 includes an integrator block 16 which calculates the integral term of a first difference $\Delta I_Q$ existing between the motor torque current reference $I_{Qref}$ and the motor torque current measurement $I_{Qm}$, and the integral term of a second difference $\Delta I_D$ existing between the motor flux current reference $I_{Dref}$ and the motor flux current measurement $I_{Dm}$.

At the point of equilibrium operation of the motor, neglecting variations of stator resistance $R_S$ and leakage inductance $L_F$, we have the following relationship expressed in vector form:

$$\begin{pmatrix} \int (I_{Dref} - I_{Dm}) \\ \int (I_{Qef} - I_{Qm}) \end{pmatrix} = \begin{pmatrix} \int \Delta I_D \\ \int \Delta I_Q \end{pmatrix} = K \begin{pmatrix} \Delta L_R \\ \Delta R_R \end{pmatrix}$$

in which $\Delta L_R$ and $\Delta R_R$ represent the relative correction values of the rotor inductance and the rotor resistance respectively and in which the coefficient K can be expressed as a rotation matrix that depends on $T_R$ and $W_G$, with:

$W_G$ representing the slip speed known by $W_G = W_S - W_m$, where $W_S$ is the frequency of the electrical power distribution network and $W_m$ is the motor speed measurement, $T_R$ representing the image of the motor's time constant $T_R = R_R/L_R$.

Therefore, we have the following relationship:

$$\begin{pmatrix} \int \Delta I_D \\ \int \Delta I_Q \end{pmatrix} = \frac{W_S}{k_1(T_R^2 + W_G^2)} \begin{pmatrix} W_G T_R^1 & -W_G T_R^1 \\ T_R^2 & W_G^2 \end{pmatrix} \begin{pmatrix} \Delta L_R \\ \Delta R_R \end{pmatrix}$$

Thus, in the steady-state operation of the motor, the calculations of the integral terms of the current differences $\Delta I_D$ and $\Delta I_Q$ can be used to determine, in real time, correction values $\Delta L_R$ and $\Delta R_R$ to be applied to the rotor inductance and to the rotor resistance of the motor so as to be able to constantly refine the motor model with real values of the rotor inductance and the rotor resistance.

The current regulator block 15 therefore includes a parameter adaptor block 18 which receives at its input the integral terms of $\Delta I_D$ and $\Delta I_Q$ so as to calculate $\Delta L_R$ and $\Delta R_R$ in order to obtain corrected values of the rotor inductance $L_R$ and the rotor resistance $R_R$ of the motor, as well as other motor parameters which depend on $L_R$ and $R_R$, such as for example $T_R$. By virtue of the invention, as long as the integral terms of $\Delta I_D$ and $\Delta I_Q$ will not be zero, the parameters $L_R$ and $R_R$ will be adjusted, thus continuously improving the parameters of the motor model. As soon as the exact values of $L_R$ and $R_R$ are arrived at, the integral terms of $\Delta I_D$ and $\Delta I_Q$ will then converge to zero.

The new corrected parameters are then introduced in a compensation (or feedforward) block 17 which calculates the static (offset) parts of the flux control voltage $U_{Dstat}$ and of the torque control voltage $U_{Qstat}$, given the following relationships:

$$U_{Dstat} = (R_R + R_S) * I_{Dref} - L_F * W_S * I_{Qref} - R_R/L_R * \Phi_{ref}$$

$$U_{Qstat} = (R_R + R_S) * I_{Qref} + L_F * W_S * I_{Dref} - W_m * \Phi_{ref}$$

in which $\Phi_{ref}$ represents the reference flux or rated flux of the motor $= U_N/W_N$.

The static parts of the voltages $U_{Dstat}$, $U_{Qstat}$ from the compensation block 17 are then added with the proportional and integral terms of $\Delta I_D$ and $\Delta I_Q$ respectively from the output of the integrator block 16, in order to provide at the output of the current regulator block 15 the flux control voltage setting $U_D$ and of the torque control voltage setting $U_Q$ to be applied to the motor, according to the following relationships:

$$U_D = U_{Dstat} + K_P * \Delta I_D + K_I * \int \Delta I_D$$

$$U_Q = U_{Qstat} + K_P * \Delta I_Q + K_I * \int \Delta I_Q$$

in which $K_P$ and $K_I$ represent, respectively, the proportional gain and the integral gain of the current regulation.

Preferably, the parameters $L_R$ and $R_R$ are corrected using the method described in the present invention only when the motor speed measurement ($W_m$) exceeds a predetermined threshold value, for example equal to 5 Hz. Below this threshold value, the stator resistance $R_S$ of the motor becomes dominant with respect to the other parameters and a relative error can disrupt the correct operation of the method described.

The adjustment method therefore includes the following steps:

a step for determining the integral term of the first difference $\Delta I_Q$, and the integral term of the second difference $\Delta I_D$, performed in the integrator block 16, a step for calculating the correction value $\Delta R_R$ and the correction value $\Delta L_R$ from the integral term of the first difference $\Delta I_Q$ and from the integral term of the second difference $\Delta I_D$, a step for adjusting the values of parameters $L_R$ and $R_R$ of the motor model based on the correction values $\Delta L_R$ and $\Delta R_R$, these two steps being performed in the adaptor block 18, a step for generating at the output of the regulator block 15 the flux control voltage $U_D$ and the torque control voltage $U_Q$ applied to the motor M, using the adjusted motor parameter values. This step for generating $U_D$ and $U_Q$ includes a step for calculating the static parts $U_{Dstat}$ and $U_{Qstat}$ in the compensation block 17 and a step for adding $U_{Dstat}$ and $U_{Qstat}$ with the proportional and integral terms of $\Delta I_D$ and $\Delta I_Q$ to give $U_D$ and $U_Q$.

Clearly it is possible, without departing from the context of the invention, to imagine other variants and minor improvements and likewise envisage the use of equivalent means.

The invention claimed is:

1. Method for adjusting motor parameters in a variable speed drive intended to control an electric induction motor (M), wherein the method comprises:

a step for determining a first difference ($\Delta I_Q$) between a motor torque current reference ($I_{Qref}$) and a motor torque current measurement ($I_{Qm}$), and a second difference ($\Delta I_D$) between a motor flux current reference ($I_{Dref}$) and a motor flux current measurement ($I_{Dm}$), a step for calculating a correction value ($\Delta R_R$) of the motor's rotor resistance and a correction value ($\Delta L_R$) of the motor's rotor inductance from the integral term of said first difference ($\Delta I_Q$) and from the integral term of said second difference ($\Delta I_D$), a step for adjusting values of parameters of the motor model based on said correction values ($\Delta L_R$, $\Delta R_R$) of the rotor inductance and the rotor resistance, a step for generating control voltages ($U_D$, $U_Q$) to be applied to the motor (M), using said adjusted motor parameter values.

2. Method according to claim 1, wherein the torque current reference ($I_{Qref}$) is obtained from a motor speed reference ($W_{ref}$) and from a motor speed measurement ($W_m$).

3. Method according to claim 2, wherein the method is executed in the variable speed drive when the motor speed measurement ($W_m$) exceeds a predetermined threshold value.

4. Variable speed drive intended to control an electric induction motor (M), equipped with a processing unit (10) including a current regulator block (15) delivering control voltages of the motor (M), wherein the current regulator block (15) comprises:

an integrator block (16) to determine a first difference ($\Delta I_Q$) between a motor torque current reference ($I_{Qref}$) and a motor torque current measurement ($I_{Qm}$), and a second difference ($\Delta I_D$) between a motor flux current reference ($I_{Dref}$) and a motor flux current measurement ($I_{Dm}$), an adaptor block (18) calculating a correction value ($\Delta R_R$) of the motor's rotor resistance and a correction value ($\Delta L_R$) of the motor's rotor inductance from the integral term of said first difference ($\Delta I_Q$) and from the integral term of said second difference ($\Delta I_D$), and adjusting values of parameters of the motor model based on said correction values ($\Delta L_R$, $\Delta R_R$) of the rotor inductance and the rotor resistance, a compensation block (17) using said adjusted motor parameter values to generate control voltages ($U_D$, $U_Q$) to be applied to the motor (M).

5. Variable speed drive according to claim 4, wherein the processing unit (10) includes a speed regulator block (11) calculating the torque current reference ($I_{Qref}$) from a motor speed reference ($W_{ref}$) and from a motor speed measurement ($W_m$).

6. Variable speed drive according to claim 5, wherein the calculation of the rotor resistance correction value ($\Delta R_R$) and of the rotor inductance correction value ($\Delta L_R$) is implemented in the adaptor block (18) when the motor speed measurement ($W_m$) exceeds a predetermined threshold value.

* * * * *